J. W. SHAW.
HOSE PIPE.
APPLICATION FILED MAR. 31, 1909.
989,304.
Patented Apr. 11, 1911.
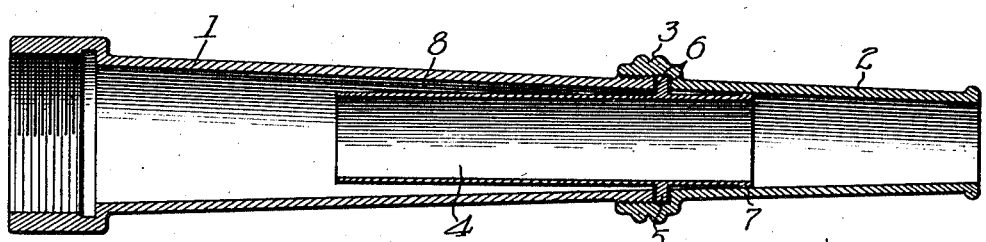
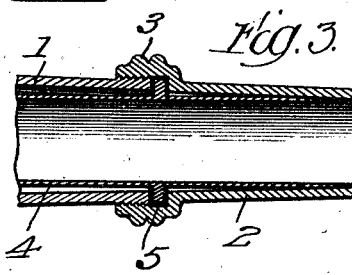
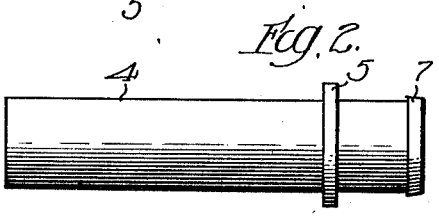
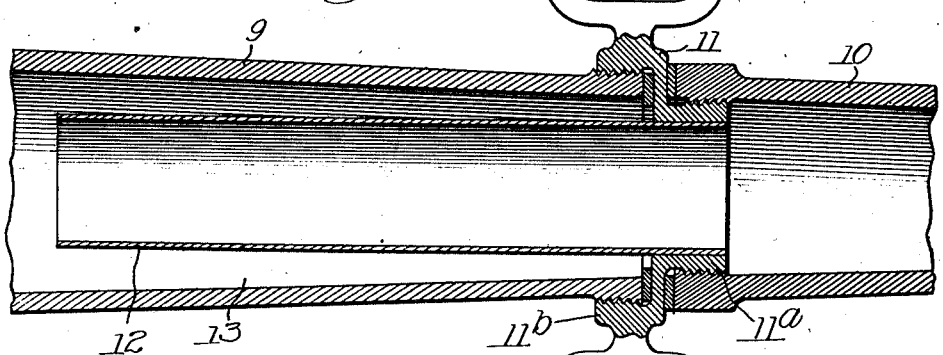
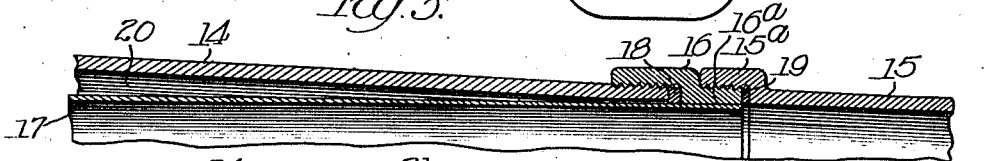
Witnesses:
Harold G. Barrett
Robert H. Weir
Inventor:
John W. Shaw,
By Rector, Hibben & Davis
his Attys

UNITED STATES PATENT OFFICE.

JOHN W. SHAW, OF PLAINFIELD, NEW JERSEY, ASSIGNOR OF ONE-HALF TO WILLIAM McINTOSH, OF PLAINFIELD, NEW JERSEY.

HOSE-PIPE.

989,304.

Specification of Letters Patent.

Patented Apr. 11, 1911.

Application filed March 31, 1909. Serial No. 486,954.

*To all whom it may concern:*

Be it known that I, JOHN W. SHAW, a citizen of the United States, residing at Plainfield, in the county of Union and State of New Jersey, have invented certain new and useful Improvements in Hose-Pipes, of which the following is a specification.

My invention relates to hose pipes, particularly those used in connection with fire hose and the object thereof is to provide novel and efficient means for overcoming the reactionary force at the nozzle when under pressure of the water or other fluid with the result that with this force controlled the nozzle can be easily handled by one person and the efficiency of the hose pipe and manipulation thereof greatly increased. Moreover, a great amount of danger is thereby eliminated, particularly when the hose pipe is being used on buildings and elevations where the firemen have difficulty in maintaining their footing in manipulation of the hose pipe.

Broadly speaking my invention consists in providing within a hose pipe an inner tube in such manner as to form an annular air space or cushioning chamber between the bore of the pipe and the tube, such tube being arranged axially of the pipe and of the line of flow of the water or other fluid, thereby offering no obstruction to the free flow thereof and at the same time enabling the water to act properly upon the annular cushioning space or chamber containing the air which becomes compressed by the water pressure.

The features of advantage and utility in my new hose pipe will be apparent from the description hereinafter given.

In the drawing Figure 1 is a longitudinal section of a hose pipe embodying my invention; Fig. 2 an elevation of the tube therein; Fig. 3 a detail section showing a modified method of connection or attachment of the outer end of the tube to the pipe; Fig. 4 a longitudinal section of a modified form of my device; Fig. 5 a similar view of another modified form thereof; and Fig. 6 a detail view of a modified form showing the tube integral with the hose pipe.

Referring to the embodiment of my invention as illustrated in Figs. 1 and 2 the hose pipe which is adapted to be screwed upon the end of the hose is made in two sections 1 and 2. In the present instance, the section 2 has at its inner end a socket portion 3 which is internally screw-threaded to screw upon the outer end of the hose pipe section 1 as clearly indicated in Fig. 3. Within the hose pipe is arranged a tube 4 of less diameter than any portion of the hose pipe in which it is located and arranged axially thereof. This tube may have a straight bore, that is a bore of uniform diameter from end to end or may be tapered as desired but in the present instance the same is shown as having such straight bore. This tube may be secured in place within the hose pipe in suitable manner but in the particular form now being described the same is clamped in place in the act of screwing the two hose pipe sections together. To this end the tube is provided with a circumferential flange 5 toward its outer end, which flange is clamped between the outer edge of the section 1 and the bottom of the socket 3 of the other section, gaskets 6 being interposed between said parts as shown. The extreme outer end of this tube is in this form of device provided with a flange 7 which is inclined to correspond with the taper of the bore of the hose pipe with the result that when two sections of the hose pipe are screwed together such outer end of the tube will fit closely and form a perfect joint with such bore.

The described construction and relation of parts forms an annular space or chamber 8 between the tube and the hose pipe 1, which space is closed at its front end but open at its rear end. It is in this space that the air is trapped and compressed by the water or other fluid when flowing through the hose pipe with the result that the reactionary force of the hose pipe and nozzle when under pressure is overcome or balanced. Moreover, the tube 4 being in axial alinement with the nozzle and the line of flow of the water, the flow is unobstructed and unimpeded and furthermore such arrangement enables the air cushion to act most effectively in thus balancing or overcoming the reactionary force.

Instead of forming the extreme front end of the tube with an inclined flange the same may be tapered considerably at such end and moreover may be brazed or otherwise permanently secured directly to the inner bore of the section 2 as indicated in the modified form illustrated in Fig. 3.

My invention may partake of other embodiments without departing from the spirit of my invention. For instance, as shown in Fig. 4, the two sections of the pipe may be secured together by an intermediate connection or coupling nut which is itself employed as a means of attachment of the tube. As shown the two sections 9 and 10 of the hose pipe are connected together by means of the coupling nut 11 which is of the peculiar shape shown, being of two diameters with a screw-threaded portion 11$^a$ screwing internally within the nozzle section 10 and with another screw-threaded portion 11$^b$ screwing externally upon the other or hose pipe section 9. The tube 12 is located within the hose pipe in axial alinement therewith but in this instance the same is secured in suitable manner, as by brazing, to the internal bore of the portion 11$^a$ of the coupling nut. For convenience in handling the pipe the coupling nut is here shown as provided with handles 11$^c$ and as will be obvious the same provision of handles might be made in respect to the socket portion 3 of the form of device illustrated in Fig. 1. In the modified form of device illustrated in Fig. 4 an annular air space or cushioning chamber 13 is provided between the tube and the hose pipe, similar to the cushioning space or chamber 8 and the action and the results are the same.

In Fig. 5 I have illustrated another modified form of construction containing features of the two previously described modifications illustrated in Figs. 1 and 4. In this modified form the two sections 14 and 15 of the hose pipe are connected together by means of the coupling nut 16, the outer end 16$^a$ of which, however, corresponds with the bore of the nozzle proper marked 15 and is screw-threaded into the socket portion 15$^a$ of such latter section. In this instance the tube 17 is secured by brazing or otherwise to said outer end portion 16$^a$ so as to be permanently attached thereto. By preference, ring gaskets 18 and 19 are employed between the clamped parts. In this modified form as in the other forms an air space or cushioning chamber 20 is formed in the same manner and for the same purpose as the cushioning chambers hereinbefore referred to. It is obvious that if desired the coupling nut 16 could be provided with grasping handles such as shown in Fig. 4.

It will be understood that the hose pipe need not be made in sections (in two or even three as herein shown) but in a single piece and also that the tube need not be made separate from the hose pipe for as will be obvious from Fig. 6, such tube may be formed integral therewith. In this modified form of construction, the tube 21 is integral with the hose pipe 22 and may be considered a continuation of the inner walls thereof, the hose pipe being swelled out to form the interposed cushioning chamber 23 which connects at its rearward end with the interior of the hose pipe by means of the openings 24, although the communication may be had by means of holes.

By reason of my invention I am enabled to provide an efficient hose pipe which is capable of being manipulated by one person and without impeding or interfering with the pressure and speed of flow of the water or other fluid. Moreover, I accomplish these results in an extremely simple and inexpensive manner.

I claim:

1. In a hose pipe, the combination, with such hose pipe made in two sections, of a tube arranged within and axially of the hose pipe and of less diameter to form an annular air space or cushioning chamber between the tube and hose pipe, such space being closed at its front end and open at its rear end, one section of the hose pipe having a socket portion engaging the other section, and the tube having a circumferential flange which is clamped within such socket portion by said two hose pipe sections, said tube being also provided at its outer end with an inclined flange adapted to fit against the bore of the hose pipe.

2. The combination of a tapering nozzle formed of two sections, one of which is threaded within the other, a substantially cylindrical tube within the nozzle provided with a circumferential flange intermediate its ends and clamped between the sections of the tapering nozzle, one end of the inner tube fitting within and held from movement by the tapering nozzle.

3. In a hose pipe, the combination, with such hose pipe made in two sections, of a tube arranged within and axially of the hose pipe and of less diameter to form an annular air space or cushioning chamber between the tube and hose pipe, said space being closed at its front end and open at its rear end and said tube being clamped in place by said two hose pipe sections, and grasping handles connected with the hose pipe at the joint between its sections.

4. In a hose pipe, the combination, with such hose pipe made in two sections, of a tube arranged within and axially of the hose pipe and of less diameter to form an annular air space or cushioning chamber between the tube and hose pipe, such space being closed at its front end and open at its rear end, one of said hose pipe sections having a socket portion engaging the other section, and the tube having a circumferential flange which is clamped within such socket portion by the hose pipe sections, and grasping handles connected with said socket portion of one of the sections.

JOHN W. SHAW.

Witnesses:
 JOSEPH T. VAIL,
 WILLIAM McINTOSH.